(12) United States Patent
Kulavik

(10) Patent No.: US 10,946,269 B2
(45) Date of Patent: *Mar. 16, 2021

(54) METHOD AND SYSTEM FOR INTER-HEADSET COMMUNICATIONS VIA DATA OVER IN-GAME AUDIO

(71) Applicant: Voyetra Turtle Beach, Inc., Valhalla, NY (US)

(72) Inventor: Richard Kulavik, San Jose, CA (US)

(73) Assignee: Voyetra Turtle Beach, Inc., White Plains, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/424,180

(22) Filed: May 28, 2019

(65) Prior Publication Data

US 2019/0275418 A1    Sep. 12, 2019

Related U.S. Application Data

(63) Continuation of application No. 15/950,857, filed on Apr. 11, 2018, now Pat. No. 10,300,369, which is a continuation of application No. 15/614,729, filed on Jun. 6, 2017, now Pat. No. 9,943,753, which is a continuation of application No. 14/445,559, filed on Jul. 29, 2014, now Pat. No. 9,669,294.

(60) Provisional application No. 61/899,917, filed on Nov. 5, 2013.

(51) Int. Cl.
| | | |
|---|---|---|
| *A63F 13/20* | (2014.01) | |
| *A63F 13/25* | (2014.01) | |
| *A63F 13/87* | (2014.01) | |
| *A63F 13/235* | (2014.01) | |
| *A63F 13/98* | (2014.01) | |
| *H04R 5/033* | (2006.01) | |
| *A63F 13/54* | (2014.01) | |

(52) U.S. Cl.
CPC .............. *A63F 13/20* (2014.09); *A63F 13/02* (2013.01); *A63F 13/235* (2014.09); *A63F 13/25* (2014.09); *A63F 13/87* (2014.09); *A63F 13/98* (2014.09); *A63F 13/54* (2014.09); *H04R 5/033* (2013.01)

(58) Field of Classification Search
USPC ......................................................... 463/42
See application file for complete search history.

(56) References Cited

U.S. PATENT DOCUMENTS

| | | | | |
|---|---|---|---|---|
| 7,489,946 B2 * | 2/2009 | Srinivasan | .......... | H04M 1/0202 455/3.06 |
| 8,602,892 B1 * | 12/2013 | Reiss | .................... | A63F 13/424 463/35 |
| 2006/0234769 A1 * | 10/2006 | Srinivasan | .......... | H04M 1/0202 455/556.1 |

* cited by examiner

*Primary Examiner* — Pierre E Elisca
(74) *Attorney, Agent, or Firm* — McAndrews, Held & Malloy

(57) ABSTRACT

A gaming headset receives a chat audio channel that conveys chat audio. The gaming headset includes an voiceband modem that modulates data for communication over the chat audio channel, and transmits the modulated data on the chat audio channel that conveys the chat audio. The modulated data may be communicated, via the chat audio channel, to one or more devices associated with one or more other gamers that are engaged in the play of the particular game. The modulated data includes one or more dual tone multi-frequency tones. The gaming headset may also receive data, via the chat audio channel, from one or more devices associated with one or more other gamers that are engaged in the play of the particular game.

15 Claims, 13 Drawing Sheets

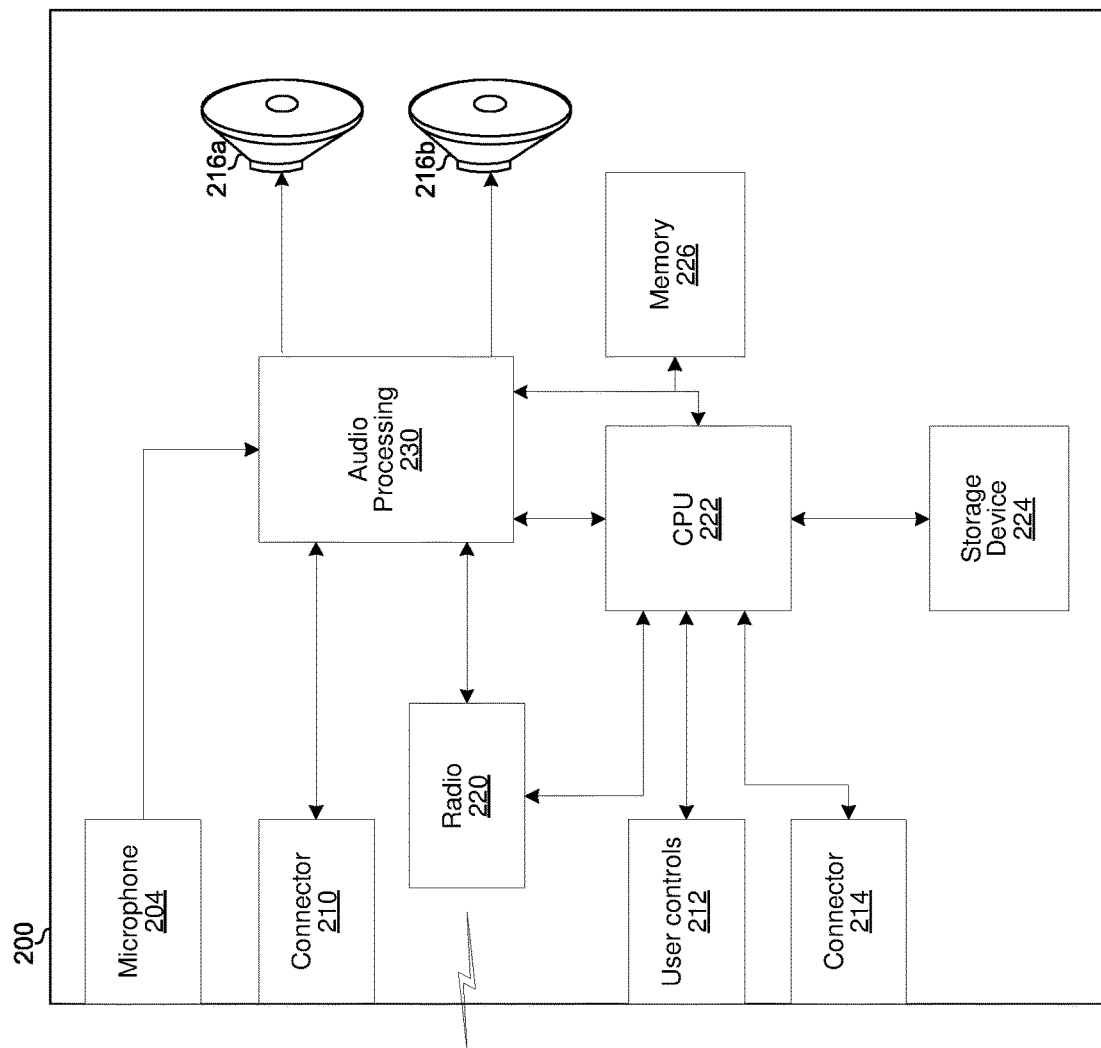

METHOD AND SYSTEM FOR INTER-HEADSET COMMUNICATIONS VIA DATA OVER IN-GAME AUDIO

CLAIM OF PRIORITY

This application is a continuation of U.S. application Ser. No. 15/950,857 filed on Apr. 11, 2018, which is a continuation of U.S. application Ser. No. 15/614,729 filed on Jun. 6, 2017, now U.S. Pat. No. 9,943,753, which is a continuation of U.S. application Ser. No. 14/445,559 filed on Jul. 29, 2014 now U.S. Pat. No. 9,669,294, which claims the benefit of priority to U.S. provisional patent application 61/899,917 filed on Nov. 5, 2013, titled "Method and System for Inter-Headset Communications via Data Over In-Game Audio," each of which is hereby incorporated herein by reference in its entirety.

INCORPORATION BY REFERENCE

U.S. patent application Ser. No. 13/040,144 titled "Game Headset with Programmable Audio" and published as US2012/0014553 is hereby incorporated herein by reference in its entirety.

TECHNICAL FIELD

Aspects of the present application relate to electronic gaming. More specifically, to methods and systems for inter-headset communications via data over in-game audio.

BACKGROUND

Limitations and disadvantages of conventional approaches to audio processing for gaming will become apparent to one of skill in the art, through comparison of such approaches with some aspects of the present method and system set forth in the remainder of this disclosure with reference to the drawings.

BRIEF SUMMARY

Methods and systems are provided for inter-headset communications via data over in-game audio, substantially as illustrated by and/or described in connection with at least one of the figures, as set forth more completely in the claims.

BRIEF DESCRIPTION OF THE DRAWINGS

FIG. 2C is a diagram that depicts a block diagram of the example headset of FIGS. 2A and 2B, in accordance with various exemplary embodiments of the disclosure.

DETAILED DESCRIPTION

Certain embodiments of the disclosure may be found in a method and system for inter-headset communications via data over in-game audio. In accordance with various aspects of the disclosure, a gaming headset receives a plurality of audio channels during play of a particular game. The plurality of audio channels comprises game audio channels that convey audio for the game, and a chat audio channel that conveys chat audio. The gaming headset includes an integrated analog voiceband modem that modulates data for communication over the chat audio channel, and transmits the modulated data on the chat audio channel that conveys the chat audio. The modulated data may be communicated, via the chat audio channel, to one or more devices associated with one or more other gamers that are engaged in the play of the particular game. The modulated data includes one or more dual tone multi-frequency tones. The gaming headset may receive data, via the chat audio channel, from one or more devices associated with one or more other gamers that are engaged in the play of the particular game. The gaming headset may demodulate the data, which is received via the chat audio channel, from the one or more devices associated with one or more other gamers that are engaged in the play of the particular game. The transmitted data and the demodulated data may comprise parameter settings, scrambling keys, and/or messages comprising text, image, and/or video content. At least a portion of the demodulated data may be converted to audio data, which may be played from speakers on the gaming headset. The gaming headset may receive the data from a second screen communication device that is communicatively coupled to the gaming headset. A gamer that is engaged in the particular game may utilize the second screen communication device to send the data. The data that is received from the second screen communication device may be communicated to another second screen communication device via the chat audio channel. The another second screen communication device may be utilized by another gamer that is engaged in the particular game. The gaming headset may acquire the modulated data from a storage device within the gaming headset.

Figure 1A:
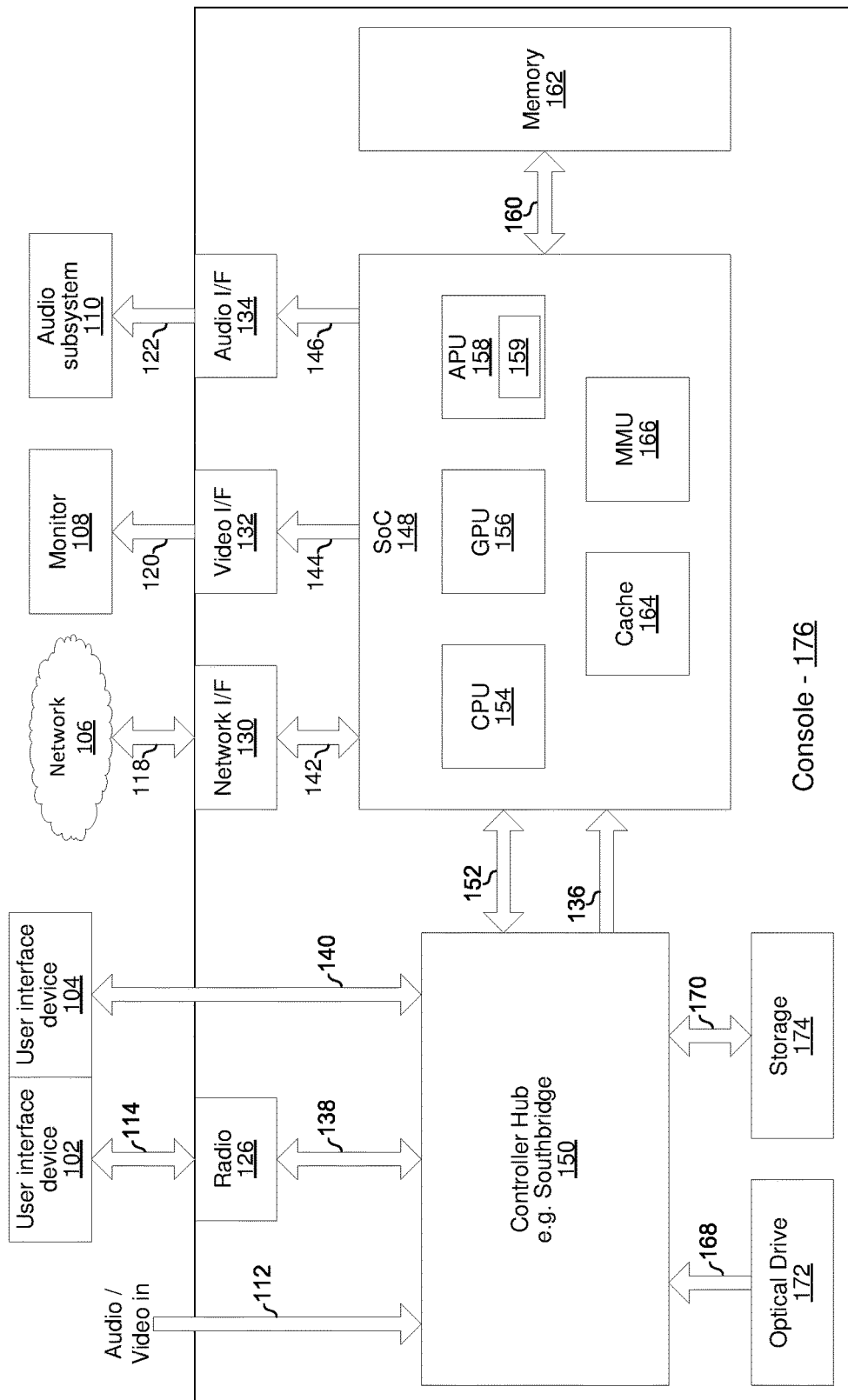
FIG. 1A is a diagram that depicts an example gaming console, which may be utilized to provide inter-headset communications via data over in-game audio, in accordance with various exemplary embodiments of the disclosure.

FIG. 1A depicts an example gaming console, which may be utilized to provide inter-headset communications via data over in-game audio, in accordance with various exemplary embodiment of the disclosure. Referring to FIG. 1A, there is shown a console 176, user interface devices 102, 104, a monitor 108, an audio subsystem 110, and a network 106.

The game console 176 may comprise suitable logic, circuitry, interfaces and/or code that may be operable to present a game to, and also enable game play interaction between, one or more local players and/or one or more remote players. The game console 176 which may be, for example, a Windows computing device, a Unix computing device, a Linux computing device, an Apple OSX computing device, an Apple iOS computing device, an Android computing device, a Microsoft Xbox, a Sony Playstation, a Nintendo Wii, or the like. The example game console 176 comprises a radio 126, network interface 130, video interface 132, audio interface 134, controller hub 150, main system on chip (SoC) 148, memory 162, optical drive 172, and storage device 174. The SoC 148 comprises central processing unit (CPU) 154, graphics processing unit (GPU) 156, audio processing unit (APU) 158, cache memory 164, and memory management unit (MMU) 166. The various components of the game console 176 are communicatively coupled through various buses/links 112, 138, 140, 142, 144, 146, 152, 136, 160, 168, and 170.

The controller hub 150 comprises circuitry that supports one or more data bus protocols such as High-Definition Multimedia Interface (HDMI), Universal Serial Bus (USB), Serial Advanced Technology Attachment II, III or variants thereof (SATA II, SATA III), embedded multimedia card interface (e.MMC), Peripheral Component Interconnect Express (PCIe), or the like. The controller hub 150 may also be referred to as an input/output (I/O) controller hub. Exemplary controller hubs may comprise Southbridge, Haswell, Fusion and Sandybridge. The controller hub 150 may be operable to receive audio and/or video from an external source via link 112 (e.g., HDMI), from the optical drive (e.g., Blu-Ray) 172 via link 168 (e.g., SATA II, SATA III), and/or from storage 174 (e.g., hard drive, FLASH memory, or the like) via link 170 (e.g., SATA II, III and/or e.MMC). Digital audio and/or video is output to the SoC 148 via link 136 (e.g., CEA-861-E compliant video and IEC 61937 compliant audio). The controller hub 150 exchanges data with the radio 126 via link 138 (e.g., USB), with external devices via link 140 (e.g., USB), with the storage 174 via the link 170, and with the SoC 148 via the link 152 (e.g., PCIe).

The radio 126 may comprise suitable logic, circuitry, interfaces and/or code that may be operable to communicate in accordance with one or more wireless standards such as the IEEE 802.11 family of standards, the Bluetooth family of standards, near field communication (NFC), and/or the like.

The network interface 130 may comprise suitable logic, circuitry, interfaces and/or code that may be operable to communicate in accordance with one or more wired standards and to convert between wired standards. For example, the network interface 130 may communicate with the SoC 148 via link 142 using a first standard (e.g., PCIe) and may communicate with the network 106 using a second standard (e.g., gigabit Ethernet).

The video interface 132 may comprise suitable logic, circuitry, interfaces and/or code that may be operable to communicate video in accordance with one or more wired or wireless video transmission standards. For example, the video interface 132 may receive CEA-861-E compliant video data via link 144 and encapsulate/format, etc., the video data in accordance with an HDMI standard for output to the monitor 108 via an HDMI link 120.

The audio interface 134 may comprise suitable logic, circuitry, interfaces and/or code that may be operable to communicate audio in accordance with one or more wired or wireless audio transmission standards. For example, the audio interface 134 may receive CEA-861-E compliant audio data via the link 146 and encapsulate/format, etc. the video data in accordance with an HDMI standard for output to the audio subsystem 110 via an HDMI link 122.

The central processing unit (CPU) 154 may comprise suitable logic, circuitry, interfaces and/or code that may be operable to execute instructions for controlling/coordinating the overall operation of the game console 176. Such instructions may be part of an operating system of the device 192 (FIG. 1C) and/or part of one or more software applications running on the device 192 (FIG. 1C).

The graphics processing unit (GPU) 156 may comprise suitable logic, circuitry, interfaces and/or code that may be operable to perform graphics processing functions such as compression, decompression, encoding, decoding, 3D rendering, and/or the like.

The audio processing unit (APU) 158 may comprise suitable logic, circuitry, interfaces and/or code that may be operable to perform audio processing functions such as volume/gain control, compression, decompression, encoding, decoding, surround-sound processing, and/or the like to output single channel or multi-channel (e.g., 2 channels for stereo or 6, 8, or more channels for surround sound) audio. The APU 158 comprises memory (e.g., volatile and/or non-volatile memory) 159 which stores parameter settings to affect processing of audio by the APU 158. For example, the parameter settings may include a first audio gain/volume setting that determines, at least in part, a volume of game audio output by the console 176 and a second audio gain/volume setting that determines, at least in part, a volume of chat audio output by the console 176. The parameter settings may be modified via a graphical user interface (GUI) of the console and/or via an application programming interface (API) provided by the console 176.

The cache memory 164 may comprise suitable logic, circuitry, interfaces and/or code that may provide high-speed memory functions for use by the CPU 154, GPU 156, and/or APU 158. The cache memory 164 may typically comprise DRAM or variants thereof. The memory 162 may comprise additional memory for use by the CPU 154, GPU 156, and/or APU 158. The memory 162, typically DRAM, may operate at a slower speed than the cache memory 164 but may also be less expensive than cache memory as well as operate at a higher speed than the memory of the storage device 174. The MMU 166 controls accesses by the CPU 154, GPU 156, and/or APU 158 to the memory 162, the cache 164, and/or the storage device 174.

In FIG. 1A, the example game console 176 is communicatively coupled to the user interface device 102, the user interface device 104, the network 106, the monitor 108, and the audio subsystem 110.

Each of the user interface devices 102 and 104 may comprise, for example, a game controller, a keyboard, a motion sensor/position tracker, or the like. The user interface device 102 communicates with the game console 176 wirelessly via link 114 (e.g., Wi-Fi Direct, Bluetooth, NFC and/or the like). The user interface device 102 may be operable to communicate with the game console 176 via the wired link 140 (e.g., USB or the like).

The network 106 comprises a local area network and/or a wide area network. The game console 176 communicates with the network 106 via wired link 118 (e.g., Gigabit Ethernet).

The monitor 108 may be, for example, a LCD, OLED, or PLASMA screen. The game console 176 sends video to the monitor 108 via link 120 (e.g., HDMI).

The audio subsystem 110 may be, for example, a headset, a combination of headset and audio basestation, or a set of speakers and accompanying audio processing circuitry. The game console 176 sends audio to the audio subsystem 110 via link(s) 122 (e.g., S/PDIF for digital audio or "line out" for analog audio). Additional details of an example audio subsystem 110 are described below.

Figure 1B:
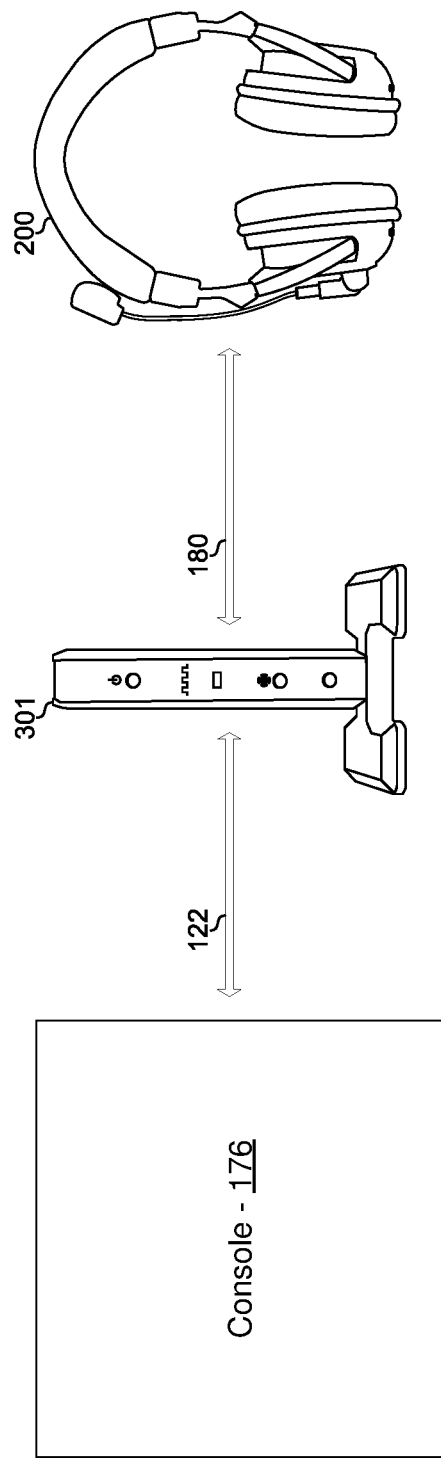
FIG. 1B is a diagram that depicts an example gaming audio subsystem comprising a headset and an audio basestation, in accordance with various exemplary embodiments of the disclosure.
Figure 1C:
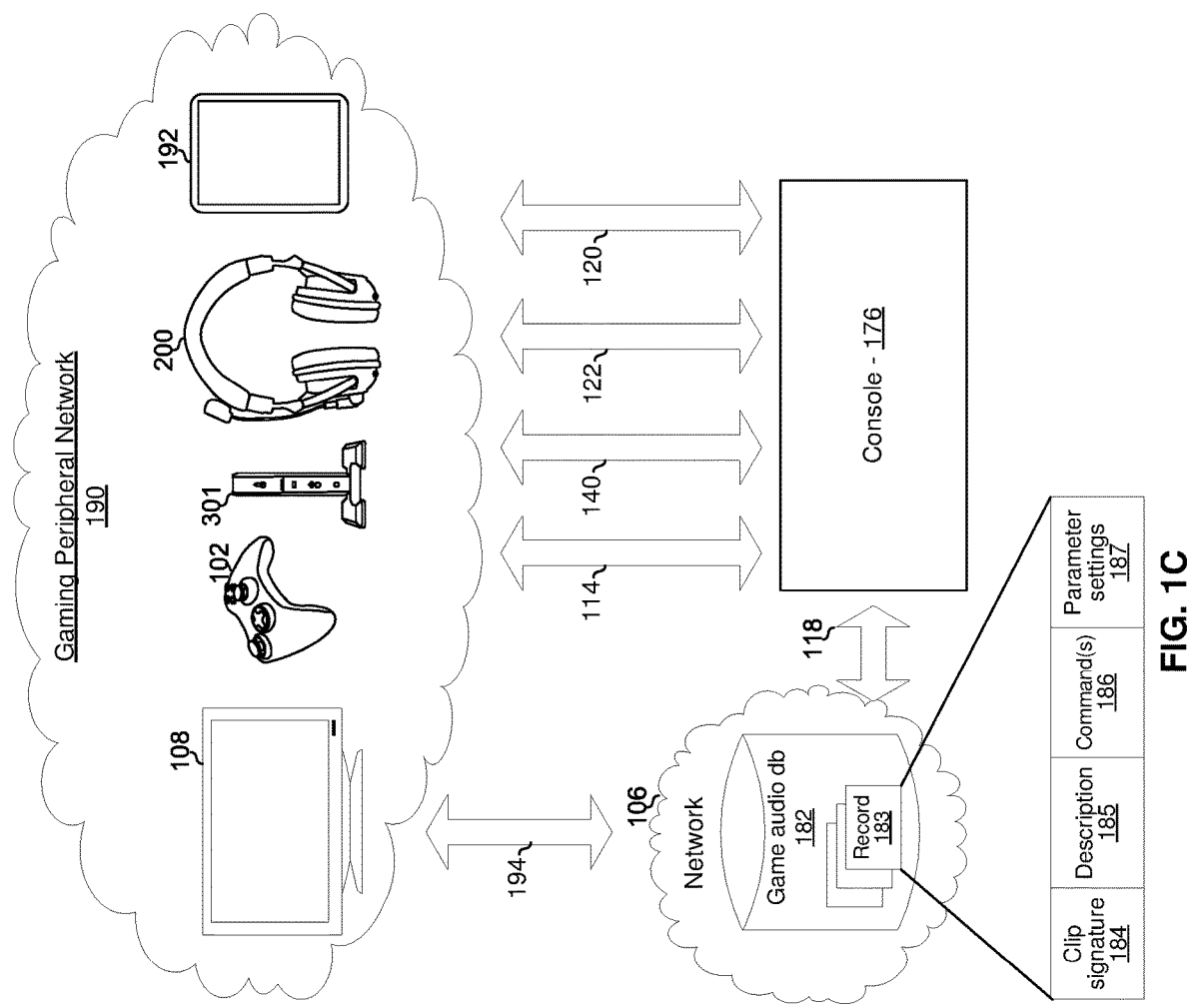
FIG. 1C is a diagram of an exemplary gaming console and an associated network of peripheral devices, in accordance with various exemplary embodiments of the disclosure.

FIG. 1B is a diagram that depicts an example gaming audio subsystem comprising a headset and an audio basestation, in accordance with various exemplary embodiments of the disclosure. Referring to FIG. 1B, there is shown a console 176, a headset 200 and an audio basestation 301. The headset 200 communicates with the basestation 301 via a link 180 and the basestation 301 communicates with the console 176 via a link 122. The link 122 may be as described above. In an example implementation, the link 180 may be a proprietary wireless link operating in an unlicensed frequency band. The headset 200 may be as described below with reference to FIGS. 2A-2C. The basestation 301 may be as described below with reference to FIGS. 3A-3B.

FIG. 1C is a diagram of an exemplary gaming console and an associated network of peripheral devices, in accordance with various exemplary embodiments of the disclosure. Referring to FIG. 1C, there is shown is the console 176, which is communicatively coupled to a plurality of peripheral devices and a network 106. The example peripheral devices shown include a monitor 108, a user interface device 102, a headset 200, an audio basestation 301, and a multi-purpose device 192.

The monitor 108 and the user interface device 102 are as described above. The headset 200 is as described below with reference to FIGS. 2A-2C. The audio basestation is as described below with reference to, for example, FIGS. 3A-3B.

The multi-purpose device 192 may comprise, for example, a tablet computer, a smartphone, a laptop computer, or the like and that runs an operating system such as Android, Linux, Windows, iOS, OSX, or the like. An example multi-purpose device is described below with reference to FIG. 4. Hardware (e.g., a network adaptor) and software (i.e., the operating system and one or more applications loaded onto the device 192) may configure the device 192 for operating as part of the GPN 190. For example, an application running on the device 192 may cause display of a graphical user interface (GUI), which may enable a user to access gaming-related data, commands, functions, parameter settings, and so on. The graphical user interface may enable a user to interact with the console 176 and the other devices of the GPN 190 to enhance the user's gaming experience.

The peripheral devices 102, 108, 192, 200, 300 are in communication with one another via a plurality of wired and/or wireless links (represented visually by the placement of the devices in the cloud of GPN 190). Each of the peripheral devices in the gaming peripheral network (GPN) 190 may communicate with one or more others of the peripheral devices in the GPN 190 in a single-hop or multi-hop fashion. For example, the headset 200 may communicate with the basestation 301 in a single hop (e.g., over a proprietary RF link) and with the device 192 in a single hop (e.g., over a Bluetooth or Wi-Fi direct link), while the tablet may communicate with the basestation 301 in two hops via the headset 200. As another example, the user interface device 102 may communicate with the headset 200 in a single hop (e.g., over a Bluetooth or Wi-Fi direct link) and with the device 192 in a single hop (e.g., over a Bluetooth or Wi-Fi direct link), while the device 192 may communicate with the headset 200 in two hops via the user interface device 102. These example interconnections among the peripheral devices of the GPN 190 are merely examples, any number and/or types of links and/or hops among the devices of the GPN 190 is possible.

The GPN 190 may communicate with the console 176 via any one or more of the connections 114, 140, 122, and 120 described above. The GPN 190 may communicate with a network 106 via one or more links 194 each of which may be, for example, Wi-Fi, wired Ethernet, and/or the like.

A database 182 which stores gaming audio data is accessible via the network 106. The gaming audio data may comprise, for example, signatures (or "acoustic fingerprints") of particular audio clips (e.g., individual sounds or collections or sequences of sounds) that are part of the game audio of particular games, of particular levels/scenarios of particular games, particular characters of particular games, etc. In an example implementation, the database 182 may comprise a plurality of records 183, where each record 183 comprises an audio clip (or signature of the clip) 184, a description of the clip 185 (e.g., the game it is from, when it occurs in the game, etc.), one or more gaming commands 186 associated with the clip, one or more parameter settings 187 associated with the clip, and/or other data associated with the audio clip. Records 183 of the database 182 may be downloadable to, or accessed in real-time by, one of more devices of the GPN 190.

Figure 2A:
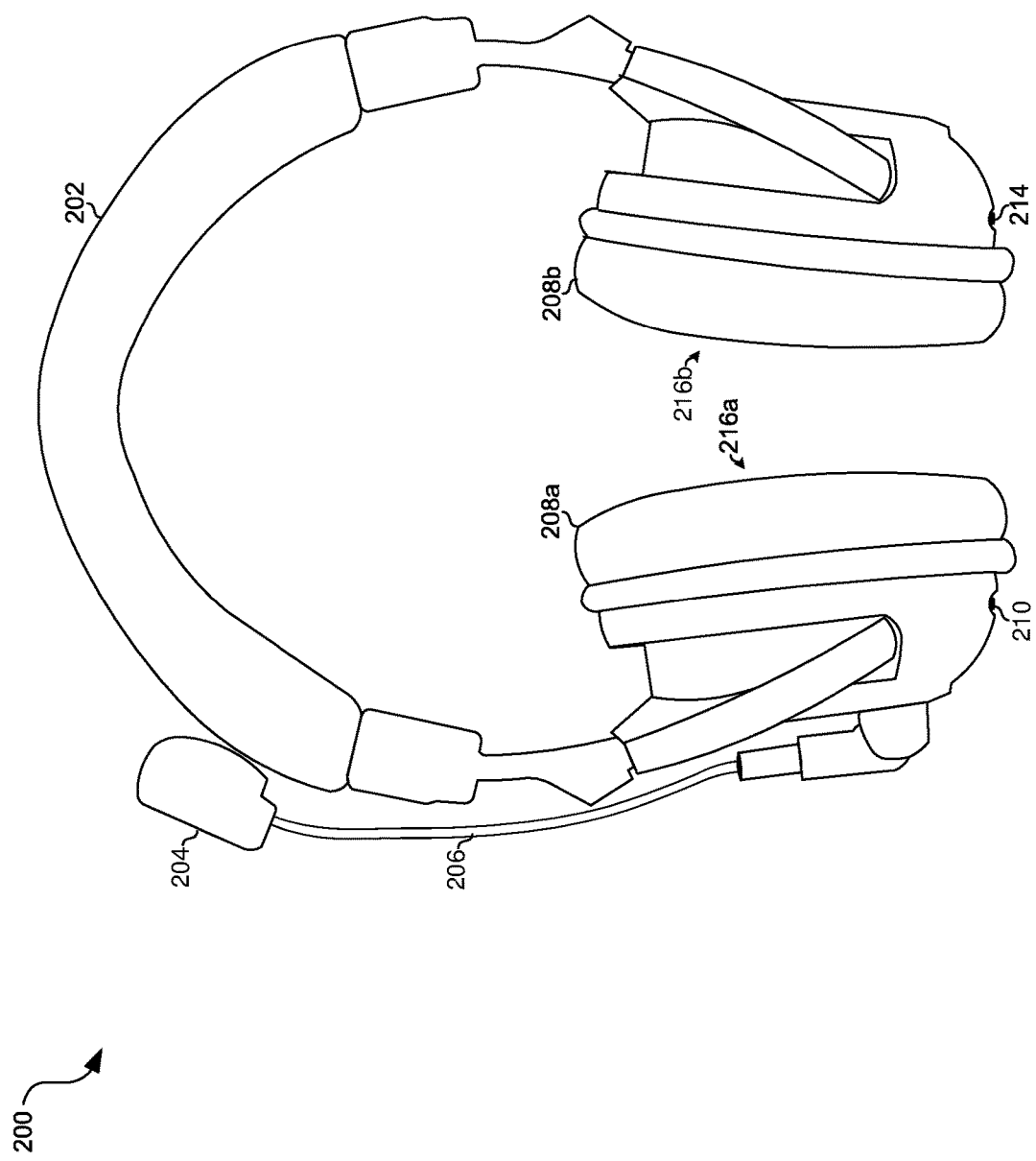
FIGS. 2A and 2B are diagrams that depict two views of an example embodiment of a gaming headset, in accordance with various exemplary embodiments of the disclosure.
Figure 2B:
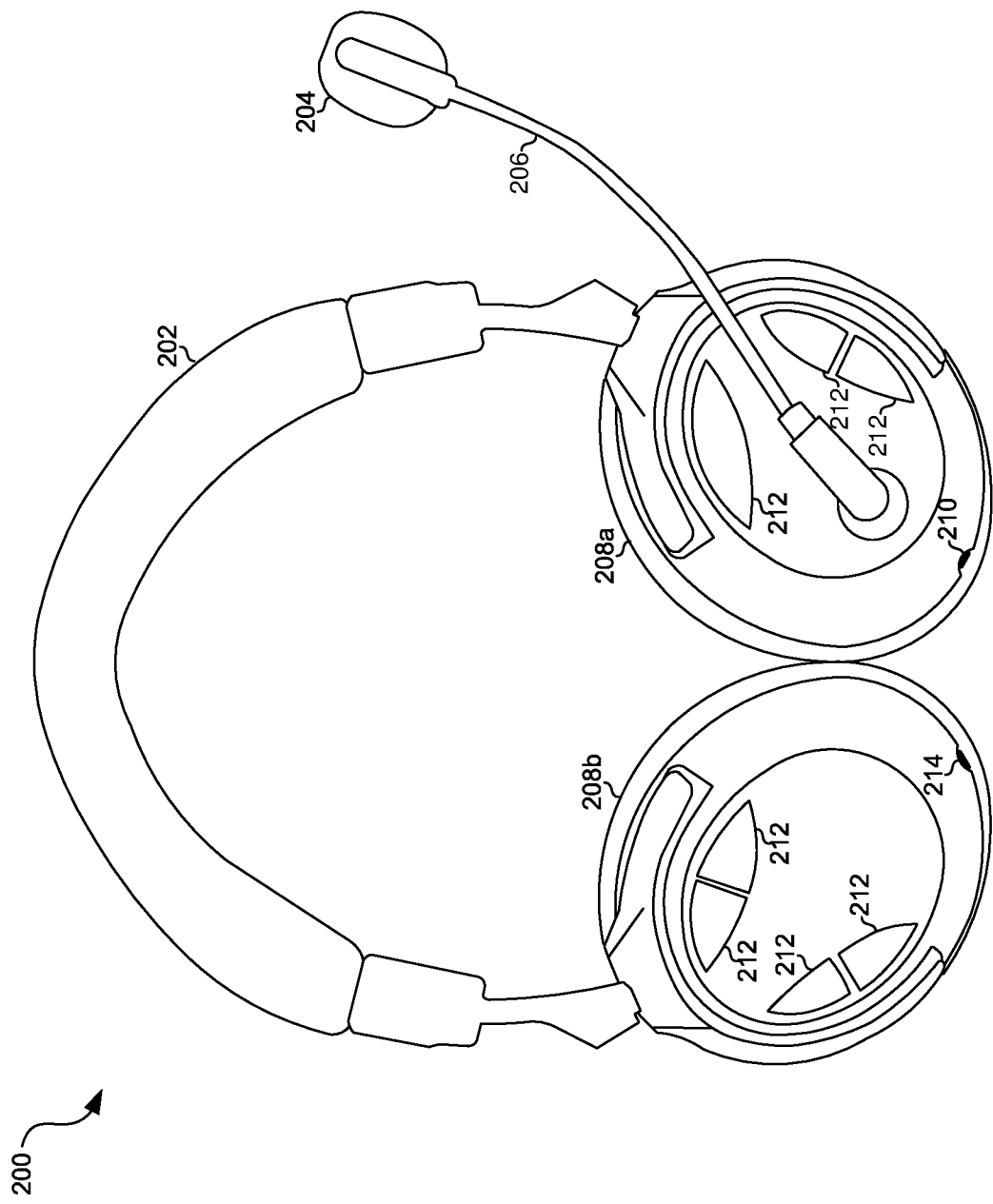

FIGS. 2A and 2B are diagrams that depict two views of an example embodiment of a gaming headset, in accordance with various exemplary embodiments of the disclosure. Referring to FIGS. 2A and 2B, there are shown two views of an example headset 200 that may present audio output by a gaming console such as the console 176. The headset 200 comprises a headband 202, a microphone boom 206 with microphone 204, ear cups 208a and 208b which surround speakers 216a and 216b, connector 210, connector 214, and user controls 212.

The connector 210 may be, for example, a 3.5 mm headphone socket for receiving analog audio signals (e.g., receiving chat audio via an Xbox "talkback" cable).

The microphone 204 may comprise suitable logic, circuitry, interfaces and/or code that may be operable to convert acoustic waves (e.g., the voice of the person wearing the headset) to electric signals for processing by circuitry of the headset and/or for output to a device (e.g., console 176, basestation 301, a smartphone, and/or the like) that is in communication with the headset.

The speakers 216a and 216b may comprise circuitry that may be operable to convert electrical signals to sound waves.

The user controls 212 may comprise dedicated and/or programmable buttons, switches, sliders, wheels, etc. for performing various functions. Example functions which the controls 212 may be configured to perform include: power the headset 200 on/off, mute/unmute the microphone 204, control gain/volume of, and/or effects applied to, chat audio by the audio processing circuitry of the headset 200, control gain/volume of, and/or effects applied to, game audio by the audio processing circuitry of the headset 200, enable/disable/initiate pairing (e.g., via Bluetooth, Wi-Fi direct, NFC, or the like) with another computing device, and/or the like. Some of the user controls 212 may adaptively and/or dynamically change during game play based on a particular game that is being played. Some of the user controls 212 may also adaptively and/or dynamically change during game play based on a particular player that is engage in the game play. The connector 214 may be, for example, a USB, thunderbolt, Firewire or other type of port or interface. The connector 214 may be used for downloading data to the headset 200 from another computing device and/or uploading data from the headset 200 to another computing device. Such data may include, for example, parameter settings (described below). Additionally, or alternatively, the connector 214 may be used for communicating with another computing device such as a smartphone, tablet compute, laptop computer, or the like.

FIG. 2C is a diagram that depicts a block diagram of the example headset of FIGS. 2A and 2B, in accordance with various exemplary embodiments of the disclosure. Referring to FIG. 2C, there is shown a headset 200. In addition to the connector 210, user controls 212, connector 214, microphone 204, and speakers 216a and 216b already discussed, shown are a radio 220, a CPU 222, a storage device 224, a memory 226, and an audio processing circuit 230.

The radio 220 may comprise suitable logic, circuitry, interfaces and/or code that may be operable to communicate in accordance with one or more standardized (such as, for example, the IEEE 802.11 family of standards, NFC, the Bluetooth family of standards, and/or the like) and/or proprietary wireless protocol(s) (e.g., a proprietary protocol for receiving audio from an audio basestation such as the basestation 301).

The CPU 222 may comprise suitable logic, circuitry, interfaces and/or code that may be operable to execute instructions for controlling/coordinating the overall operation of the headset 200. Such instructions may be part of an operating system or state machine of the headset 200 and/or part of one or more software applications running on the headset 200. In some implementations, the CPU 222 may be, for example, a programmable interrupt controller, a state machine, or the like.

The CPU 222 may also be operable to handle inter-headset communications via data over in-game audio of a plurality of audio channels. In this regard, the CPU 222 may be operable to control the receiving of a plurality of audio channels comprising game audio channels that convey audio for the game, and a chat audio channel that conveys chat audio. The CPU 222 may be operable to dynamically configure a voiceband modem that is integrated within the gaming headset 200 to handle modulation of data for communication over the chat audio channel. The CPU 222 may be operable to control the transmission of the modulated data on the chat audio channel that conveys the chat audio. In this regard, the CPU 222 may be operable to control the communication of the modulated data to one or more devices associated with one or more other gamers that are engaged in the play of the particular game, via the chat audio channel. The modulated data may include, for example, one or more dual tone multi-frequency (DTMF) tones.

The storage device 224 may comprise suitable logic, circuitry, interfaces and/or code that may comprise, for example, FLASH or other nonvolatile memory, which may be operable to store data comprising operating data, configuration data, settings, and so on, which may be used by the CPU 222 and/or the audio processing circuit 230. Such data may include, for example, parameter settings that affect processing of audio signals in the headset 200 and parameter settings that affect functions performed by the user controls 212. For example, one or more parameter settings may determine, at least in part, a gain of one or more gain elements of the audio processing circuit 230. As another example, one or more parameter settings may determine, at least in part, a frequency response of one or more filters that operate on audio signals in the audio processing circuit 230. As another example, one or more parameter settings may determine, at least in part, whether and which sound effects are added to audio signals in the audio processing circuit 230 (e.g., which effects to add to microphone audio to morph the user's voice). Example parameter settings which affect audio processing are described in the co-pending U.S. patent application Ser. No. 13/040,144 titled "Game Headset with Programmable Audio" and published as US2012/0014553, the entirety of which is hereby incorporated herein by reference. Particular parameter settings may be selected autonomously by the headset 200 in accordance with one or more algorithms, based on user input (e.g., via controls 212), and/or based on input received via one or more of the connectors 210 and 214.

The memory 226 may comprise suitable logic, circuitry, interfaces and/or code that may comprise volatile memory used by the CPU 222 and/or audio processing circuit 230 as program memory, for storing runtime data, etc. In this regard, the memory 226 may comprise information and/or data that may be utilized to control the headset 200 to modulate data for transmission over the chat audio channel and demodulate data that is received from the chat audio channel.

The audio processing circuit 230 may comprise suitable logic, circuitry, interfaces and/or code that may be operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 230 may be determined, at least in part, by which parameter settings have been selected. The processing performed by the audio processing circuit 230 may also be determined based on default settings, player preference, and/or by adaptive and/or dynamic changes to the game play environment. The processing may be performed on game, chat, and/or microphone audio that is subsequently output to speaker 216a and 216b. Additionally, or alternatively, the processing may be performed on chat audio that is subsequently output to the connector 210 and/or radio 220.

In operation, the headset 200 may be operable to modulate data for communication over the chat audio channel. The headset 200 may be operable to transmit the modulated data on the chat audio channel. The headset 200 may be operable to receive data over the chat audio channel and demodulate the received data. During transmission, the headset 200 may be operable to communicate the transmitted data to one or more devices (e.g., headsets) associated with one or more other gamers that are engaged in play of the game. During reception, the headset 200 may be operable to receive the transmitted data from one or more of the devices that are associated with the one or more other gamers that are engaged in play of the game.

Figure 3A:
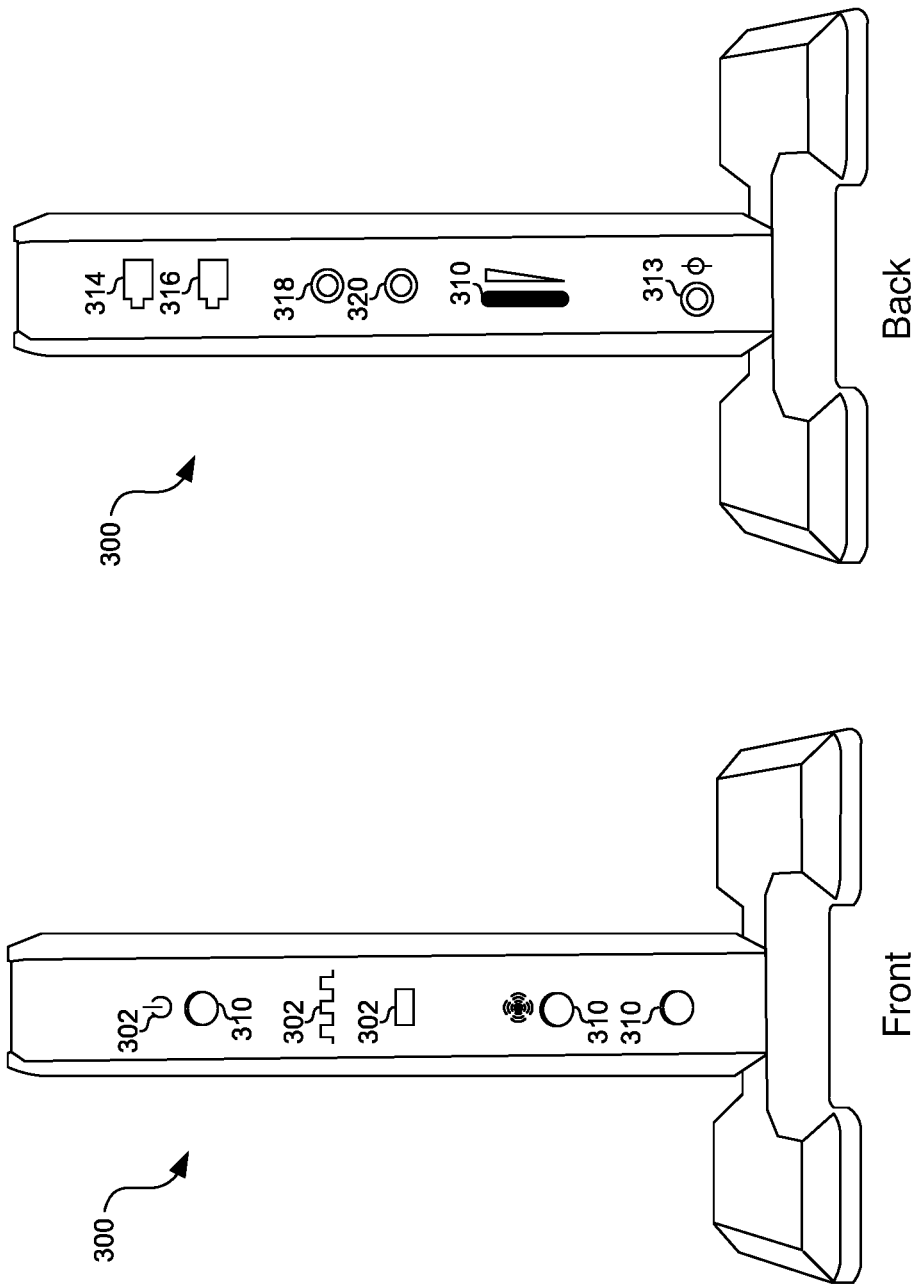
FIG. 3A is a diagram that depicts two views of an example embodiment of an audio basestation, in accordance with various exemplary embodiments of the disclosure.

FIG. 3A is a diagram that depicts two views of an example embodiment of an audio basestation, in accordance with various exemplary embodiments of the disclosure. Referring to FIG. 3A, there is shown an exemplary embodiment of an audio basestation 301. The basestation 301 comprises status indicators 302, user controls 310, power port 313, and audio connectors 314, 316, 318, and 320.

The audio connectors 314 and 316 may comprise digital audio in and digital audio out (e.g., S/PDIF) connectors, respectively. The audio connectors 318 and 320 may comprise a left "line in" and a right "line in" connector, respectively. The controls 310 may comprise, for example, a power button, a button for enabling/disabling virtual surround sound, a button for adjusting the perceived angles of the speakers when the virtual surround sound is enabled, and a dial for controlling a volume/gain of the audio received via the "line in" connectors 318 and 320. The status indicators 302 may indicate, for example, whether the audio basestation 301 is powered on, whether audio data is being received by the basestation 301 via connectors 314, and/or what type of audio data (e.g., Dolby Digital) is being received by the basestation 301.

Figure 3B:
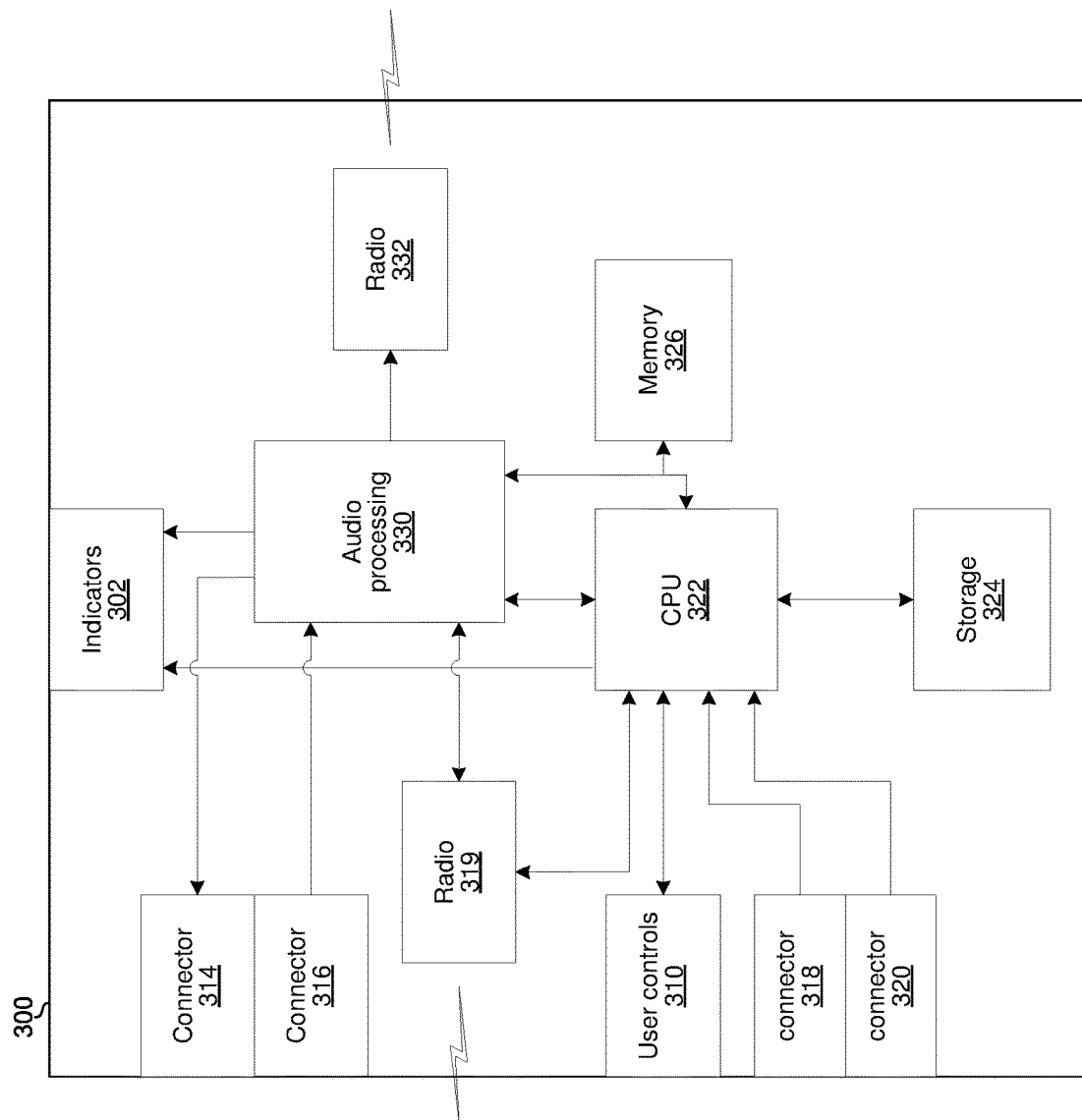
FIG. 3B is a diagram that depicts a block diagram of the audio basestation, in accordance with various exemplary embodiments of the disclosure.

FIG. 3B is a diagram that depicts a block diagram of the audio basestation 301, in accordance with various exemplary embodiments of the disclosure. Referring to FIG. 3B, there is shown an exemplary embodiment of an audio basestation 301. In addition to the user controls 310, indicators 302, and connectors 314, 316, 318, and 320 described above, the block diagram additionally shows a CPU 322, a storage device 324, a memory 326, a 319, an audio processing circuit 330, and a radio 332.

The 319 comprises suitable logic, circuitry, interfaces and/or code that may be operable to communicate in accordance with one or more standardized (such as the IEEE 802.11 family of standards, the Bluetooth family of standards, NFC, and/or the like) and/or proprietary (e.g., proprietary protocol for receiving audio protocols for receiving audio from a console such as the console 176) wireless protocols.

The radio 332 comprises suitable logic, circuitry, interfaces and/or code that may be operable to communicate in accordance with one or more standardized (such as, for example, the IEEE 802.11 family of standards, the Bluetooth family of standards, and/or the like) and/or proprietary wireless protocol(s) (e.g., a proprietary protocol for transmitting audio to the headphones 200).

The CPU 322 comprises suitable logic, circuitry, interfaces and/or code that may be operable to execute instructions for controlling/coordinating the overall operation of the audio basestation 301. Such instructions may be part of an operating system or state machine of the audio basestation 301 and/or part of one or more software applications running on the audio basestation 301. In some implementations, the CPU 322 may be, for example, a programmable interrupt controller, a state machine, or the like.

The storage 324 may comprise, for example, FLASH or other nonvolatile memory for storing data which may be used by the CPU 322 and/or the audio processing circuit 330. Such data may include, for example, parameter settings that affect processing of audio signals in the basestation 301. For example, one or more parameter settings may determine, at least in part, a gain of one or more gain elements of the audio processing circuit 330. As another example, one or more parameter settings may determine, at least in part, a frequency response of one or more filters that operate on audio signals in the audio processing circuit 330. As another example, one or more parameter settings may determine, at least in part, whether and which sound effects are added to audio signals in the audio processing circuit 330 (e.g., which effects to add to microphone audio to morph the user's voice). Example parameter settings which affect audio processing are described in the co-pending U.S. patent application Ser. No. 13/040,144 titled "Gaming Headset with Programmable Audio" and published as US2012/0014553, the entirety of which is hereby incorporated herein by reference. Particular parameter settings may be selected autonomously by the basestation 301 in accordance with one or more algorithms, based on user input (e.g., via controls 310), and/or based on input received via one or more of the connectors 314, 316, 318, and 320.

The memory 326 may comprise volatile memory used by the CPU 322 and/or audio processing circuit 330 as program memory, for storing runtime data, etc.

The audio processing circuit 330 may comprise suitable logic, circuitry, interfaces and/or code that may be operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 330 may be determined, at least in part, by which parameter settings have been selected. The processing may be performed on game and/or chat audio signals that are subsequently output to a device (e.g., headset 200) in communication with the basestation 301. Additionally, or alternatively, the processing may be performed on a microphone audio signal that is subsequently output to a device (e.g., console 176) in communication with the basestation 301.

Figure 4:
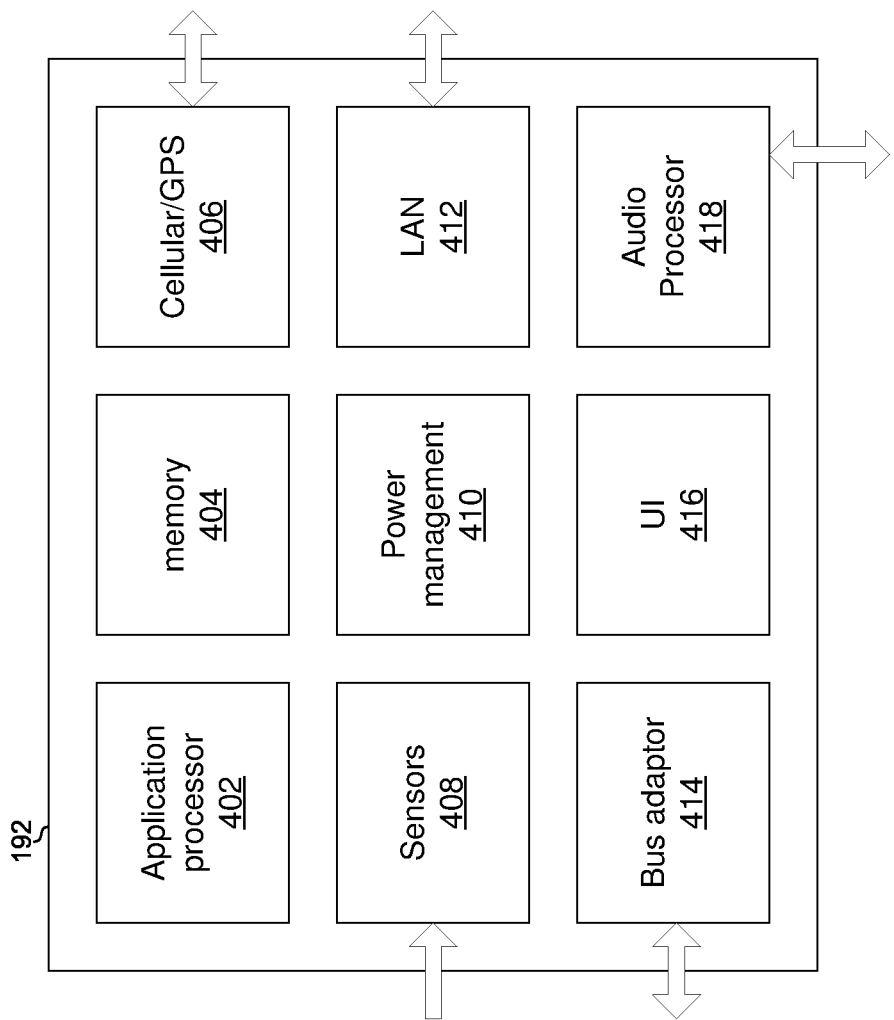
FIG. 4 is a block diagram of an exemplary multi-purpose device, in accordance with various exemplary embodiments of the disclosure.

FIG. 4 is a block diagram of an exemplary multi-purpose device 192, in accordance with various exemplary embodiments of the disclosure. The example multi-purpose device 192 comprises an application processor 402, memory subsystem 404, a cellular/GPS networking subsystem 406, sensors 408, power management subsystem 410, LAN subsystem 412, bus adaptor 414, user interface subsystem 416, and audio processor 418.

The application processor 402 comprises suitable logic, circuitry, interfaces and/or code that may be operable to execute instructions for controlling/coordinating the overall operation of the multi-purpose device 192 as well as graphics processing functions of the multi-purpose device 1922. Such instructions may be part of an operating system of the console and/or part of one or more software applications running on the console.

The memory subsystem 404 comprises volatile memory for storing runtime data, nonvolatile memory for mass storage and long-term storage, and/or a memory controller which controls reads/writes to memory.

The cellular/GPS networking subsystem 406 comprises suitable logic, circuitry, interfaces and/or code that may be operable to perform baseband processing and analog/RF processing for transmission and reception of cellular and GPS signals.

The sensors 408 comprise, for example, a camera, a gyroscope, an accelerometer, a biometric sensor, and/or the like.

The power management subsystem 410 comprises suitable logic, circuitry, interfaces and/or code that may be operable to manage distribution of power among the various components of the multi-purpose device 192.

The LAN subsystem 412 comprises suitable logic, circuitry, interfaces and/or code that may be operable to perform baseband processing and analog/RF processing for transmission and reception of wired, optical, and/or wireless signals (e.g., in accordance with Wi-Fi (IEEE 802.11 and variants thereof 802.11 e.g., a, b, g, n, ac, q, Wi-FI Direct), Bluetooth, ZigBee, Ethernet, and/or other standards).

The bus adaptor 414 comprises suitable logic, circuitry, interfaces and/or code that may be operable for interfacing one or more internal data busses of the multi-purpose device with an external bus (e.g., a Universal Serial Bus) for transferring data to/from the multi-purpose device via a wired connection.

The user interface subsystem 416 comprises suitable logic, circuitry, interfaces and/or code that may be operable to control and relay signals to/from a touchscreen, hard buttons, and/or other input devices of the multi-purpose device 192.

The audio processor 418 comprises suitable logic, circuitry, interfaces and/or code that may be operable to process (e.g., digital-to-analog conversion, analog-to-digital conversion, compression, decompression, encryption, decryption, resampling, etc.) audio signals. The audio processor 418 may be operable to receive and/or output signals via a connector such as a 3.5 mm stereo and microphone connector.

Figure 5A:
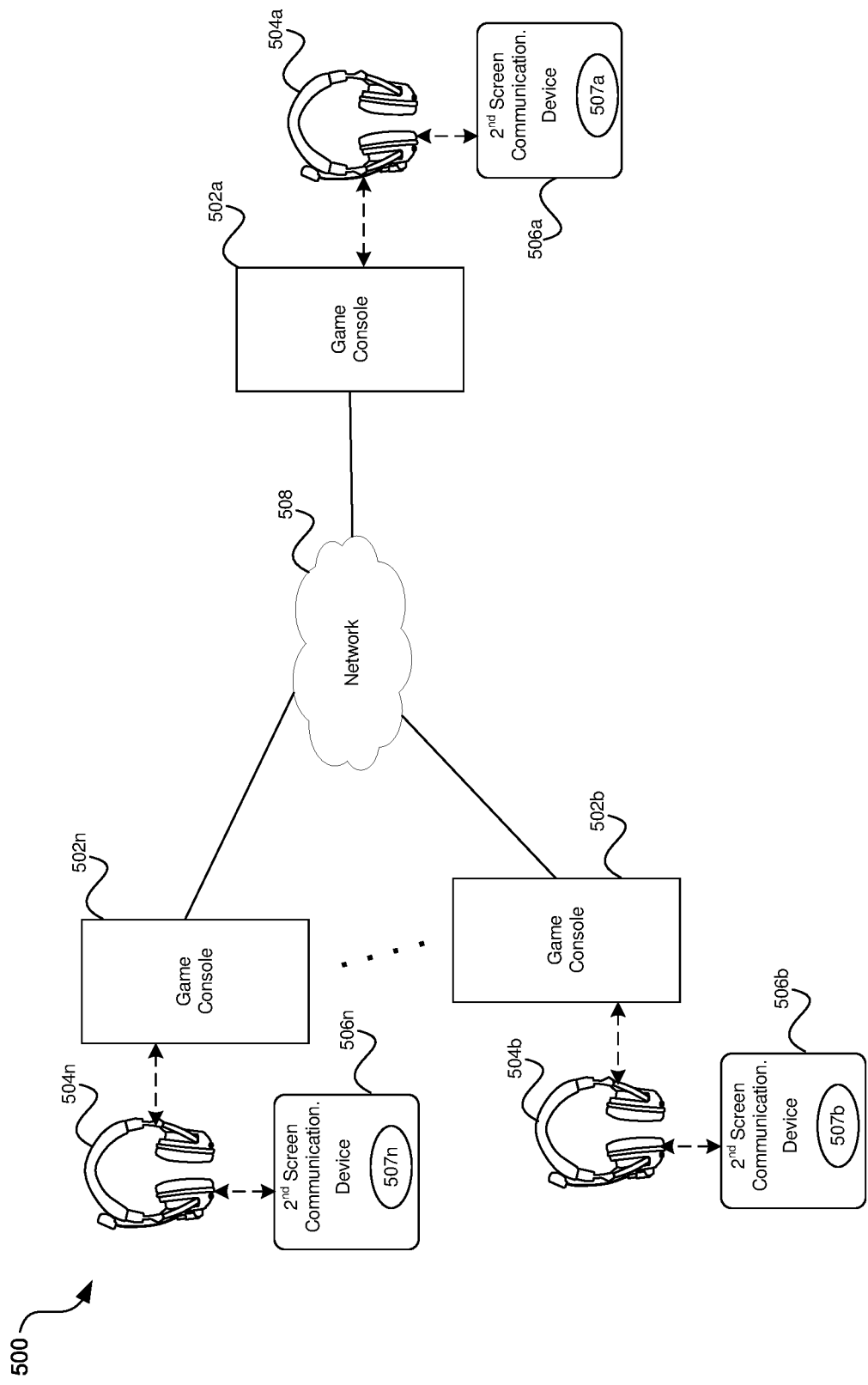
FIG. 5A is a diagram of an exemplary system that enables inter-headset communication over in-game audio, in accordance with various exemplary embodiments of the disclosure.

FIG. 5A is a diagram of an exemplary system that enables inter-headset communication over in-game audio, in accordance with various exemplary embodiments of the disclosure. Referring to FIG. 5, there are shown an exemplary system 500 comprising a plurality of game consoles 502a, 502b, . . . , 502n, a plurality of gaming headsets 504a, 504b, . . . , 504n, a plurality of second screen communication devices 506a, 506b, . . . , 506n, and a network 508. Each of the plurality of second screen communication devices 506a, 506b, . . . , 506n may comprise a corresponding application 507a, 507b, . . . , 507n that runs thereon. The plurality of game consoles 502a, 502b, . . . , 502n may be collectively referenced as game consoles 502. The plurality of gaming headsets 504a, 504b, . . . , 504n may be collectively referenced as gaming headsets 504. The plurality of second screen communication devices 506a, 506b, . . . , 506n may be collectively referenced as second screen communication devices 506.

Each of the plurality of game consoles 502a, 502b, . . . , 502n may comprise suitable logic, circuitry, interfaces and/ or code that may be operable to present a game to, and also enable game play interaction between, one or more local players and/or one or more remote players. For example, a gamer utilizing the gaming headset 504a may engage in playing a particular game with one or more of the gamers that may be wearing the headsets 502b, . . . , 502n. Each of the plurality of game consoles 502a, 502b, . . . , 502n may be substantially similar to the game console 176 which is illustrated in and described with respect to, for example, FIGS. 1A, 1B, and 1C. Each of the plurality of game consoles 502a, 502b, . . . , 502n may be operable to handle a plurality of audio channels comprising game audio channels and a chat audio channel. The game audio channel is utilized to convey audio for a game and the chat audio channel is operable to convey chat audio. The game audio channel may be utilized for the transmission and reception of the game audio via the network 508. The chat audio channel may be utilized for transmission and reception of the chat audio via the network 508. The chat audio channel may carry voice data (as is conventionally carried on the chat audio channel) as well as data other that has been modulated onto one or more carriers in the chat audio band (e.g., which may be, for example, from ~500 Hz to ~2000 Hz).

In accordance with various embodiments of the disclosure, each of the plurality of game consoles 502a, 502b, . . . , 502n may be operable to convey data to and/or from respective ones of the plurality of gaming headset 504a, 504b, . . . , 504n over the chat audio channel via the network 508. For example, the game console 502b may be operable to receive data on the chat audio channel from the gaming headset 504b and convey the received data on the chat audio channel to one or more of the gaming headset 504a via the gaming console 502a, and the gaming headset 504n via the gaming console 502n. In an example embodiment, the headsets 504 and/or devices 507 may perform the modulation and demodulation of the chat audio band carriers such that the game consoles 502 are unaware that data other than voice data is present on the chat channel. In another example embodiment, the headsets 504 and/or devices 507 may communicate the raw data to the game consoles 502 and the game consoles may perform the modulation and demodulation of the data onto a carrier in the chat audio band for transmission via the chat channel.

Each of the plurality of gaming headsets 504a, 504b, . . . , 504n may comprise suitable logic, circuitry, interfaces and/or code that may be operable to receive audio from the game console to which it is connected. The received audio may comprise game audio and/or chat audio. Each of the plurality of gaming headsets 504a, 504b, . . . , 504n may also be operable to generate chat audio on the chat audio channel. In accordance with various embodiments of the disclosure, each of the plurality of gaming headsets 504a, 504b, . . . , 504n may be operable to communicate data on the chat audio channel, including voice data as is conventionally communicated on the chat channel as well as other data which is modulated onto a carrier in the chat audio band such that it can be communicated over the frequencies and bandwidths of the chat channel. The data that is communicated over the chat audio channel may be conveyed to another one of the plurality of gaming headsets 504a, 504b, . . . , 504n and/or one or more of the plurality of second screen communication devices 506a, 506b, . . . , 506n. In this regard each of the plurality of gaming headsets 504a, 504b, . . . , 504n may be operable to modulate the data onto the game audio channel for transmission. For example, the gaming headset 504n may be operable to modulate the data onto the game audio channel for transmission via the chat audio channel to the gaming headset 504a and/or the gaming headset 504b. Each of the plurality of gaming headsets 504a, 504b, . . . , 504n may be operable to demodulate the data that is received from the chat audio channel. For example, the gaming headset 504b and/or the gaming headset 504n may be operable to demodulate the data received from the gaming headset 504n via the chat audio channel. Exemplary data other than voice data that may be communicated via the chat audio channel may comprise parameter settings, scrambling keys, and/or messages comprising text, images and/or video content.

Each of the plurality of second screen communication devices 506a, 506b, . . . , 506n may comprise suitable logic, circuitry, interfaces and/or devices that may enable communication with respective ones of the plurality of gaming headsets 504a, 504b, . . . , 504n. Data sent from a first of the plurality of second screen communication devices 506a, 506b, . . . , 506n, which is coupled to a first of the plurality of gaming headsets 504a, 504b, . . . , 504n, may be communicated to one or more other ones of the plurality of second screen communication devices 506a, 506b, . . . , 506n. For example, the second screen communication devices 506a, which is communicatively coupled to the gaming headset 504a, may be operable to communicate data to the gaming headset 504a. The gaming headset 504a may be operable to modulate the data onto one or more carriers in the chat audio band for communicating the data, via the game console 502a, to one or both of the gaming headset 504b and/or the gaming headset 504n over the chat audio channel.

Each of the plurality of second screen communication devices 506a, 506b, . . . , 506n may comprise a corresponding application 507a, 507b, . . . , 507n. Each of the applications 507a, 507b, . . . , 506n running on respective ones of the plurality of second screen communication devices 506a, 506b, . . . , 506n may be operable to wirelessly communicate data to and/or receive data from respective ones of the gaming headsets 504a, 504b, . . . , 504n. In this regard, for example, a gamer utilizing the gaming headset 504b may be operable to utilize the application 507b running on the second screen communication device 506b to enter data. The entered data may be wirelessly communicated from the second screen communication device 506b to the gaming headset 504b. The gaming headset 504b may be operable to modulate the data onto one or more carriers within the chat audio band, and transmit the modulated data via the game console 502b to one or more of the second screen communication devices 506a, 506n. The second screen communication device 506b may be operable to receive data, via the gaming headset 504b, which was sent from one or more of the second screen communication devices 506a, 506n via the chat audio channel. The data which is received from one or more of the second screen communication devices 506a, 506n may be demodulated by the gaming headset 504b and communicated to the application 507b running on the second screen communication device 506b. A listener of the gaming headset 504b may consume the demodulated data via the application 507b running on the second screen communication device 506b.

The network 508 may comprise suitable interfaces and/or devices that may enable the communication of gaming information between a plurality of the game consoles 502a, 502b, . . . , 502n. The gaming information may comprise gaming video, gaming audio and/or chat audio. The network 508 may comprise the Internet, an intranet, an office network, a local area network (LAN), a wide area network (WAN), a medium area network (MAN), and/or personal area network (PAN). The network 508 may comprise a wireless and/or wired network. In this regard, the network 508 may be operable to utilize one or more technologies such as 3G, 4G, 5G, Ethernet, 802.11, 802.16, Bluetooth, and/or variants of these technologies. In various embodiments of the disclosure, the network 508 may be operable to convey data among the plurality of gaming headsets 504a, 504b, . . . , 504n via respective ones of the plurality of game consoles 502a, 502b, . . . , 502n.

In operation, each of the plurality of gaming headsets 504a, 504b, . . . , 504n may be operable to modulate data and transmit the modulated data via the chat audio channel. The modulated data may be communicated via the chat audio channel to one or more other ones of the plurality of gaming headsets 504a, 504b, . . . , 504n. The one or more other ones of the plurality of gaming headsets 504a, 504b, . . . , 504n may be operable to receive and demodulate the modulated data. The resulting demodulated data may be communicated by the one or more other ones of the plurality of gaming headsets 504a, 504b, . . . , 504n to respective ones of the one or more of the plurality of second screen communication devices 506a, 506b, . . . , 506n. In an exemplary embodiment of the disclosure, a first gamer wearing the gaming headset 504a may utilize the second screen communication device 506a to send data during play of a particular game. A second gamer wearing the gaming headset 504b may utilize the second screen communication device 506b to send data during play of the particular game. A third gamer wearing the gaming headset 504n may utilize the second screen communication device 506n to send data during play of the particular game. The first gamer may utilize the application 507a running on the second screen communication device 506a to send data to the gaming headset 504a. The gaming headset 504a may be operable to modulate the data and transmit the modulated data on the chat audio channel. The game console 502a may be operable to convey the data that is modulated on the chat audio channel to one or more of the game console 502b, . . . , 502n.

When the game console 502b receives the data that is modulated on the chat audio channel, the game console 502b may be operable to communicate the data that is modulated on the chat audio channel to the gaming headset 504b. The gaming headset 504b may be operable to demodulate the data that is received via the chat audio channel and communicate the demodulated data to the second screen communication device 506b. The application 507b, which is running on the second screen communication device 506b, may be operable to receive the demodulated data. The second screen communication device 506b may be utilized by the second gamer who is engaged in play of the particular game and is wearing the gaming headset 504b. In this regard, the second gamer may utilize the application 507b, which is running on the second screen communication device 506b, to consume the demodulated data.

When the game console 502n receives the data that is modulated on the chat audio channel, the game console 502n may be operable to communicate the data that is modulated on the chat audio channel to the gaming headset 504n. The gaming headset 504n may be operable to demodulate the data that is received via the chat audio channel and communicate the demodulated data to the second screen communication device 506n. The application 507n, which is running on the second screen communication device 506n, may be operable to receive the demodulated data. The second screen communication device 506n may be utilized by the third gamer who is engaged in play of the particular game and is wearing the gaming headset 504n. In this regard, the third gamer may utilize the application 507n, which is running on the second screen communication device 506n, to consume the demodulated data.

Figure 5B:
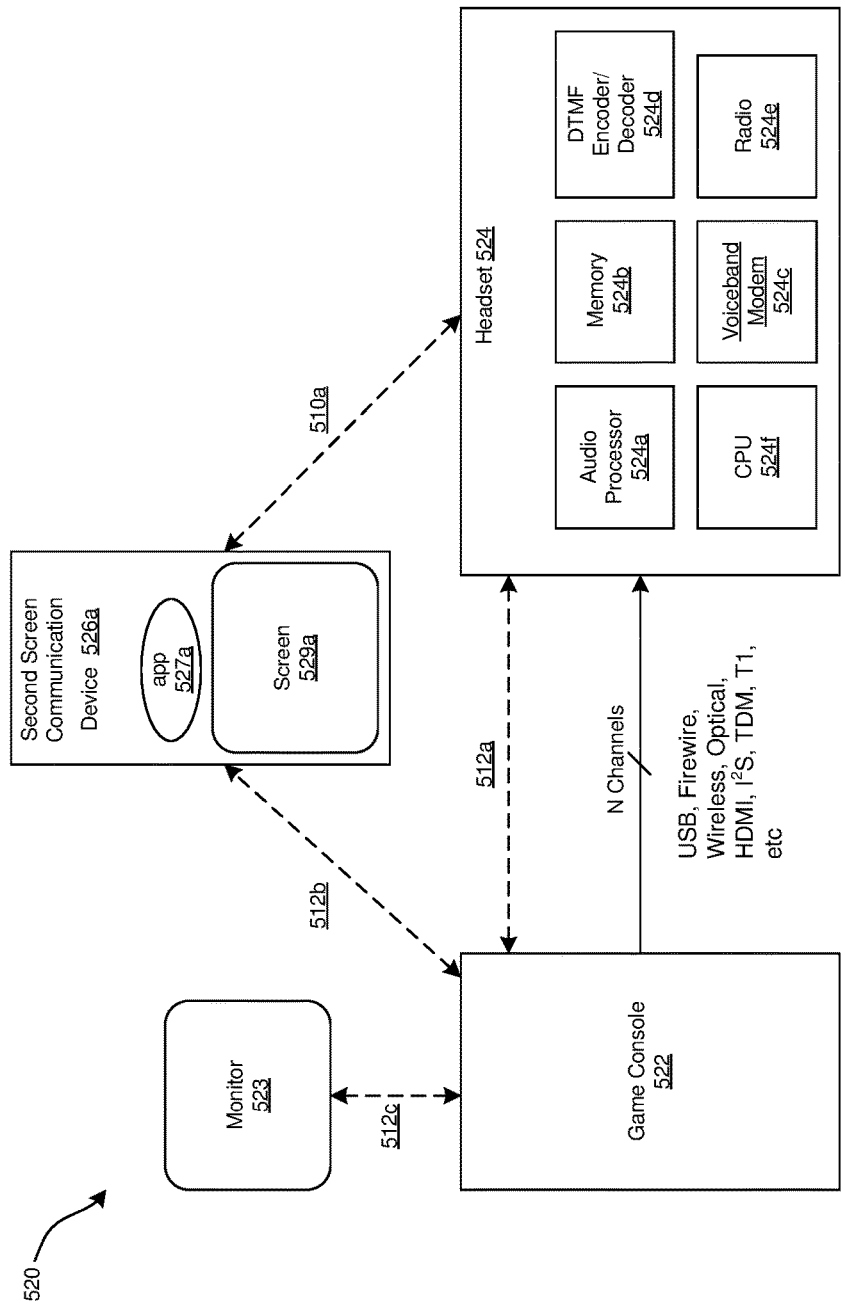
FIG. 5B is a diagram of an exemplary subsystem in a gaming headset that enables inter-headset communication over in-game audio, in accordance with various exemplary embodiments of the disclosure.

FIG. 5B is a diagram of an exemplary subsystem in a gaming headset that enables inter-headset communication over in-game audio, in accordance with various exemplary embodiments of the disclosure. Referring to FIG. 5B, there is shown an exemplary system 520 comprising a game console 522, a monitor 523, a gaming headset 524, and a second screen communication device 526a. The gaming headset 524 may comprise an audio processor 524a, a memory 524b, a voiceband modem 524c, a DTMF encoder/decoder 524d, a radio 524e and a CPU 524f. The second screen communication device 526a may comprise a screen 529a and an application 527a.

The game console 522 may comprise suitable logic, circuitry, interfaces and/or code that may be operable to present a game to, and also enable game play interaction between, one or more local players and/or one or more remote players. The game console 522 may be substantially similar to the game console 176, which is shown in and described with respect to FIG. 1A, for example. The game console 522 may be operable to generate output video signals for a particular game over a video channel and output corresponding audio signals for the game over one or more of a plurality of audio channels. Exemplary audio channels may comprise a center (CTR) channel, a front right (FR) channel, a front left (FL) channel, a rear right (RR) channel, a rear left (RL) channel, a side right (SR) channel, and a side left (SL) channel. The audio and video generated from the game console 522 during play of the particular game may be communicated to and presented by the monitor 523.

In some example embodiments of the disclosure, the basestation 301 (FIG. 1B) may be operable to provide connectivity between the gaming headset 524, the game console 522 and the second screen communication device 526a. In this regard, the basestation 301 may be operable to handle transmission and reception of the information or data between the second screen communication device 526a, the gaming headset 524 and/or to the game console 522.

The monitor 523 may comprise suitable logic, circuitry, interfaces and/or code that may be operable to display corresponding audio and video that may be received from the game console 522 for the particular game during play of the particular game play. The monitor 523 may comprise a television (TV), computer monitor, laptop display, and so on.

The gaming headset 524 may comprise suitable logic, circuitry, interfaces and/or code that may be operable to receive the plurality of audio channels of game and/or chat audio. The gaming headset 524 may be substantially similar to the headset 200, which is shown in and described with respect to FIGS. 2A, 2B and 2C, for example. The gaming headset 524 may be operable to receive data from the application 527a running on the second screen communication device 526a. The gaming headset 524 may be operable to modulate the data received from the application 527a onto a carrier in the chat audio band, and transmit the modulated data via the chat audio channel. The gaming headset 524 may be operable to demodulate the data that is received from another gaming headset, via the chat audio channel, and communicate the demodulated data to the second screen communication device 526a. Exemplary data that may be communicated via the chat audio channel may comprise voice data, parameter settings, scrambling keys, and/or messages comprising text, images and/or video content.

The audio processor 524a may comprise suitable logic, circuitry, interfaces and/or code that may be operable to handle audio processing for the gaming headset 524. For example, the audio processor 524a may be operable to handle processing of game audio, microphone audio and/or chat audio. The audio processor 524a may be substantially similar to the audio processing circuit 230, which is shown in and described with respect to FIG. 1A, for example.

The memory 524b may comprise one or more suitable devices that may comprise suitable logic, circuitry, interfaces and/or code that may be operable to store information that may be utilized to control operation of the gaming headset 524 and audio information for a game. In this regard, the memory 524b may comprise information that may be utilized to control and/or manage operation of one or more of the audio processor 524a, the memory 524b, the voiceband modem 524c, the DTMF encoder/decoder 524d, the radio 524e and a CPU 524f. The memory 524b may be substantially similar to the storage device 224, which is shown in and described with respect to FIG. 2C, for example. The memory 524a may be operable to store parameter settings, scrambling keys, and/or messages comprising text, images and/or video content.

The voiceband modem 524c may comprise suitable logic, circuitry, interfaces and/or code that may be operable to handle modulation and demodulation of data for the gaming headset 524. In an embodiment of the disclosure, the voiceband modem 524c may be an analog voiceband modem. In this regard, the voiceband modem 524c may be operable to modulate data that may be received by the gaming headset 524 from the second screen communication device 526a. A gamer that may be listening to the gaming headset 524 and is engaged in play of the particular game may enter the data by utilizing the application 527a that is running on the second screen communication device 526a. The data that is modulated by the voiceband modem 524c may be transmitted over the chat audio channel. The voiceband modem 524c may also be operable to demodulate data that is received by the gaming headset 524 via the chat audio channel by the game console 522. The demodulated data may be communicated to the application 527a running on the second screen communication device 526a, where it may be consumed by the gamer that may be listening to the gaming headset 524 and is engaged in play of the particular game.

In addition to data being entered by a user (e.g., via second screen device and/or audio commands spoken into the headset), data may be automatically inserted into the chat audio by a game console, second screen device, and/or headset. For example, in response to detecting a particular sound in the game audio or chat audio, a headset may automatically generate data, modulate the data onto a chat audio band carrier, and transmit the modulated carrier onto the chat audio channel. Similarly, a game console, headset, or second screen device may automatically take action in response to receiving data over the chat audio channel. For example, in response to receiving a parameter setting on the chat audio channel, a headset may automatically (without intervention by the wearer of the headset) load the parameter setting.

The CPU 524f may comprise suitable logic, circuitry, interfaces and/or code that may be operable to execute instructions for controlling, managing and/or coordinating the overall operation of the gaming headset 524. In this regard, the CPU 524f may be operable to control, manage and coordinate operation of the components in the gaming headset 524, which comprises the audio processor 524a, the memory 524b, the voiceband modem 524c, the DTMF encoder/decoder 524d, and the radio 524e. The CPU 524f may, for example, automatically reconfigure the audio processor 524a in response to receiving a command to do so in the form of a command modulated onto an audio band carrier and sent over the chat audio channel. The CPU 524f may also be operable to coordinate and manage operations between the gaming headset 524, and the game console 522. The CPU 524f may be substantially similar to the CPU 222, which is shown in and described with respect to FIG. 2C, for example.

The DTMF encoder/decoder 524d may comprise suitable logic, circuitry, interfaces and/or code that may be operable to encode data received from the application 527a in the second screen communication device 526a to DTMF tones. The gaming headset 524 may be operable to communicate the DTMF tones via the chat audio channel and the game console 522 to one or more other gaming headsets. The DTMF encoder/decoder 524d may also be operable to decode DTMF tones that may be received by the gaming headset 524 via the chat audio channel from the game console 522. The decoded DTMF tones may be converted to data and may be communicated from the gaming headset 524 to the application 527a in the second screen communication device 526a. A simple encoding scheme may comprise encoding one message for a particular tone. Other encoding schemes may be utilized without departing from sprit and/or scope of the various embodiments of the disclosure.

The radio 524e may comprise suitable logic, circuitry interfaces and/or code that may be operable to communicate signals between the gaming headset 524 and the game console 522 and/or between the gaming headset 524 and the second screen communication device 526a. The radio 524e may be substantially similar to the radio 220, which is illustrated in and described with respect to FIG. 2C, for example. In accordance with an example embodiment of the disclosure, the gaming headset 524 may be operable to utilize the radio 524e to communicate to and from the second screen communication device 526a via the communication link 510a and/or to the game console 522 via the communication link 512a. The gaming headset 524 may be operable to utilize the radio 524e to communicate data to and/or from the second screen communication device 526a via the communication link 510a and/or to and/or from the game console 522 via the communication link 512a. The gaming peripheral network 190 (FIG. 1C) illustrates an exemplary communication network that may be utilized for communication by the second screen communication devices 506, the game console 502, and the gaming headset 524.

The second screen communication device 526a may comprise suitable logic, circuitry interfaces and/or code that may be operable to execute or run an application 527a. A gamer listening to the headset 524 may enter data into the application 527a. The entered data may be communicated to the gaming headset 524, which may modulate the data for communication via the chat audio channel. In this regard, the second screen communication device 526a may be operable to communicate with the gaming headset 524 via the communication link 510a in order to receive the data that is to be transmitted on the game audio channel by the gaming headset 524. The second screen communication device 526a may be substantially similar to the each of the plurality of second screen communication device 506a, 506b, . . . , 506n, which are illustrated in and described with respect to FIG. 5A, for example.

The application (app) 527a may comprise suitable logic, interfaces and/or code that may enable the second screen communication device 526a to input, consume and/or receive data. In an exemplary embodiment of the disclosure, the gaming headset 524 may be operable to communicate with the app 527a, which is running on the second screen communication device 526a. A gamer listening to the headset 524 may enter data into the application 527a. The entered data may be communicated to the gaming headset 524, which may modulate the data for communication via the chat audio channel. The application 527a may also be operable to receive data that has been received, via the audio chat channel, and demodulated by the gaming headset 524.

In operation, the gaming headset 524 is operable to receive a plurality of audio channels during play of a particular game. The plurality of audio channels may comprise game audio channels that conveys audio for the particular game (game audio), and a chat audio channel that conveys chat audio. The audio processing circuit 524a may be operable to process the audio signals that are received via the plurality of received audio channels from the game console 522. In this regard, the audio processor 524a may be operable to process game audio and chat audio for output to the game console 522, and/or game audio and chat audio that may be received from the game console 522.

The CPU 524f may be operable to control the voiceband modem 524c to modulate data for communication over the chat audio channel. The modulated data may be transmitted via the chat audio channel that conveys the chat audio. The transmitted data may be communicated to a device that may be utilized by another gamer that is engaged in play of the particular game. The gaming headset 524 may be operable to acquire the modulated data from the memory 524b. The data may also be received from the application 527a, which is running on the second screen communication device 526a.

The modulated data may be communicated, via the chat audio channel, to one or more devices (e.g., second screen communication devices 506a, 506b, . . . , 506n in FIG. 5A), which may be associated with one or more other gamers that are engaged in the play of the particular game. The modulated data may comprise one or more dual tone multi-frequency tones. The gaming headset 524 may receive data, via the chat audio channel, from one or more devices associated with one or more other gamers that are engaged in the play of the particular game. The gaming headset 524 may also be operable to demodulate data, which is received via the chat audio channel, from the one or more devices (e.g., second screen communication devices 506a, 506b, . . . , 506n in FIG. 5A), which may be associated with one or more other gamers that are engaged in the play of the particular game. The transmitted data and the demodulated data may comprise parameter settings, scrambling keys, and/or messages comprising text, images, and/or video content. Some or all of the demodulated data may be converted to audio data, which may be played from speakers on the gaming headset 524.

Figure 5C:
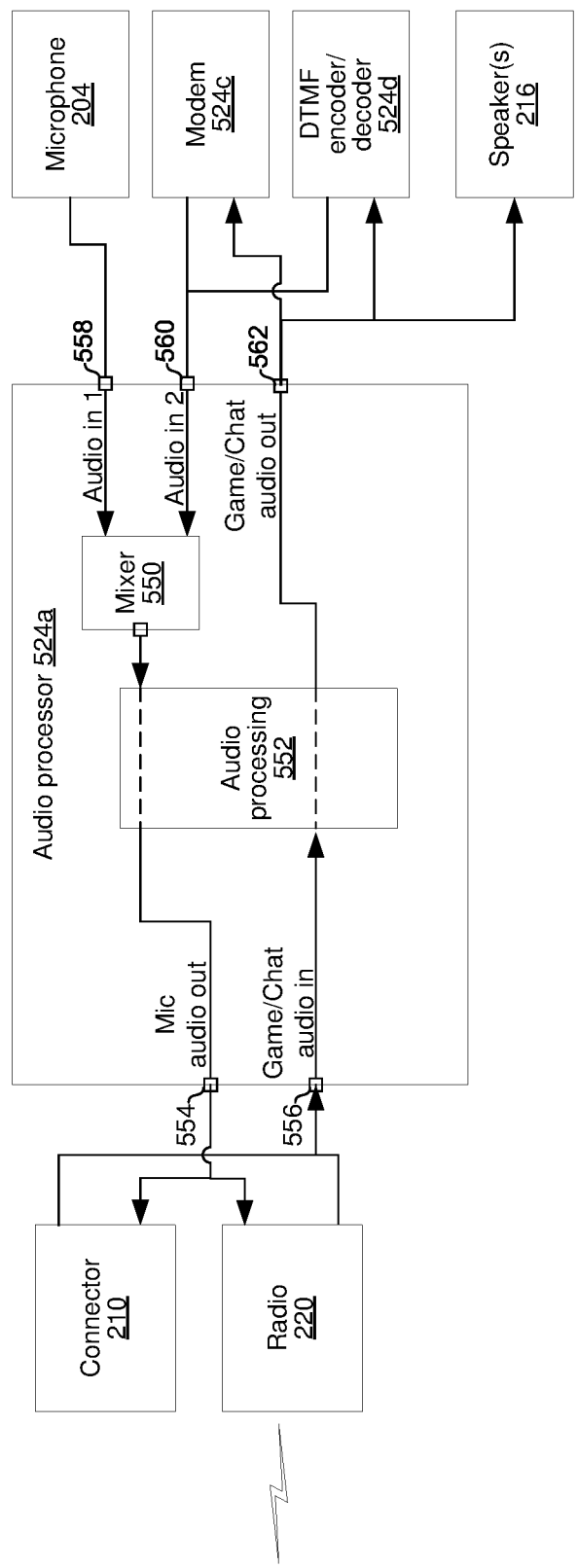
FIG. 5C shows circuitry of an example headset configured for communicating voice and non-voice data over a chat audio channel.

FIG. 5C shows circuitry of an example headset configured for communicating voice and non-voice data over a chat audio channel. Shown are the connector 210, the radio 220, the microphone 204, the modem 524c, the DTMF encoder/decoder 524d, the speakers 216, audio processor 524a. Also shown are a mixer circuit 550 of the audio processor 524a and an audio processing circuit 552 of the audio processor 524a.

The mixer 550 may be operable to combine the voice data signal received via audio input port 558 and non-voice data signal received via input port 560 into a single chat audio band signal. The output of the mixer 550 may be a chat audio band signal such that a receiving device (e.g., game consoles and/or headsets) that does not have a corresponding modem 524c and/or DTMF encoder/decoder 524d for demodulating/decoding the non-voice data may be unaware of the presence of the non-voice data and may process the chat audio as is conventionally done for output via speakers to a listener of such device. The listener of such a device may be similarly unaware of the non-voice data with the possible exception that an occasional noise, chirp, or the like may be perceived by a listener of such devices when the non-voice data is modulated onto a carrier that is within the frequency range of human hearing. To further prevent the non-voice data from interfering with the voice data, the mixer 550 may be operable to monitor for periods of silence in the voice data and insert the non-voice data into such periods, may use carriers that are near the extremes of the audible band such that noise, chirps, or the like resulting from the non-voice data are inaudible (or nearly so) to a listener of such a device, and/or may ensure the bursts of non-voice data are sufficiently short so as to not significantly interfere the ability of listeners to comprehend the voice data on the chat audio channel. The output of the mixer 550 may be processed (e.g., voice data may be morphed according to voice morph parameter settings) by circuitry 552 and then output via mic audio out port 554. In another implementation, the signals from ports 558 and 560 may be separately processed by circuit 552 before being combined into a single signal by mixer 550 and then output via port 554.

Chat audio (which may be combined with, or separate from game audio) may be received by the audio processor 524a via port 556, processed by circuitry 552 (e.g., equalized, undergo chat volume boost, etc.) and then be output via port 562. The modem 524c may monitor the output of port 562 to detect modulated non-voice data and, upon detection of such data, demodulate the data (e.g., and send it to the CPU 524f). Similarly, the DTMF decoder 524d may monitor the output of port 562 for DTMF tones and, upon detecting such a tone, decode it (e.g., and send a corresponding interrupt to CPU 524f). The speaker(s) 216 may convert the signal out of port 562 to acoustic waves. In some instances, non-voice data in the signal may result in pops, chirps, noise, etc. in the acoustic wave, but through careful control of such data, such pops, chirps, noise, etc. may be kept to a level that does not significantly hinder the experience of the listener using the headset.

Figure 6:
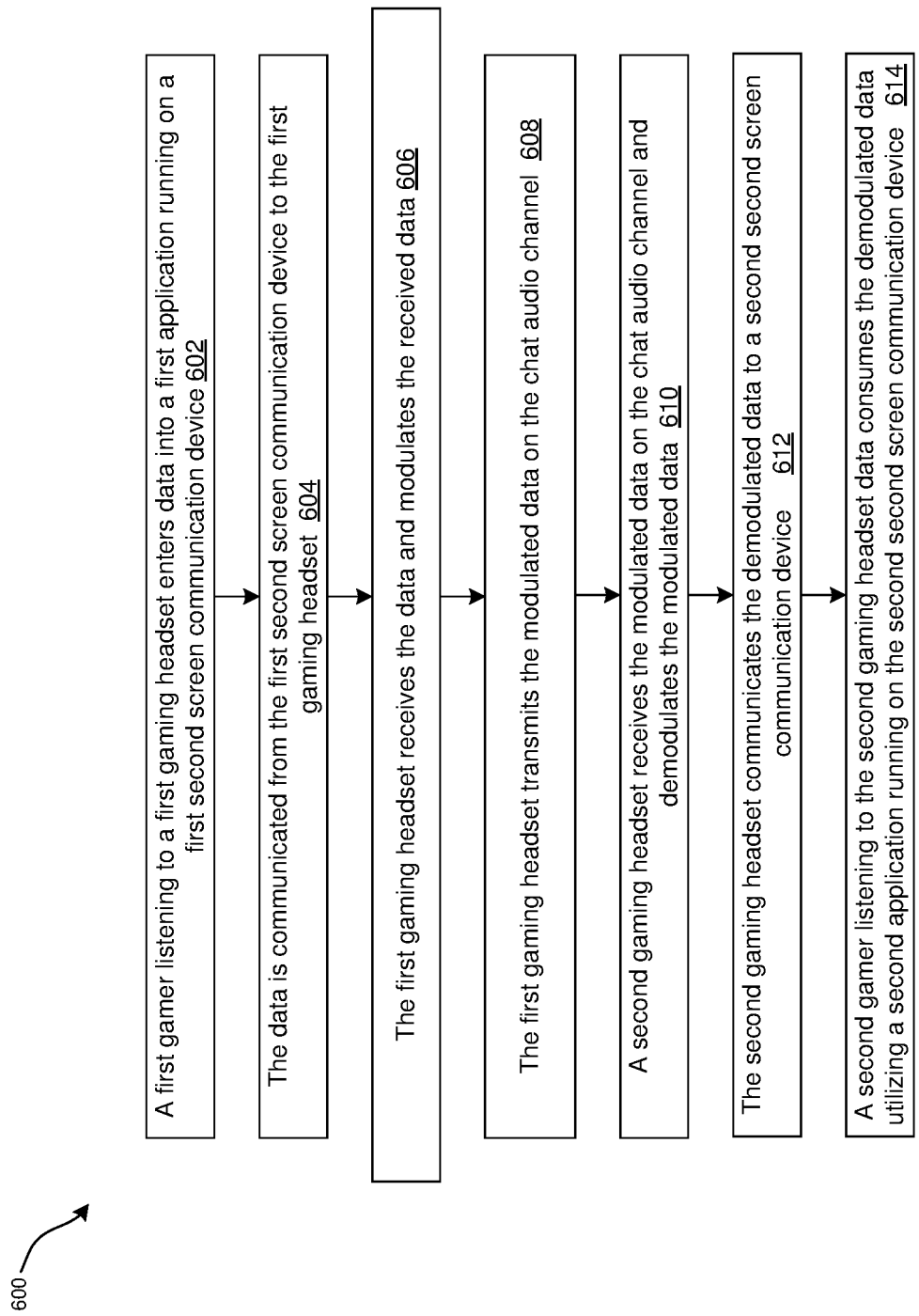
FIG. 6 is a flow diagram illustrating exemplary steps for providing inter-headset communications via data over in-game audio, in accordance with various exemplary embodiments of the disclosure.

FIG. 6 is a flow diagram illustrating exemplary steps for providing inter-headset communications via data over in-game audio, in accordance with various exemplary embodiments of the disclosure. Referring to FIG. 6, there is shown a flow chart 600 comprising a plurality of exemplary steps, namely, 602 through 614. In step 602, a first gamer listening to a first gaming headset 504a enters data into a first application running 507a on a first second screen communication device 506a. In step 604, the data is communicated from the first second screen communication device 506a to the first gaming headset 504a. In step 606, the first gaming headset 504a receives the data and modulates the received data. In step 608, the first gaming headset 504a transmits the modulated data on the chat audio channel. In step 610, a second gaming headset 504b receives the modulated data on the chat audio channel and demodulates the modulated data. In step 612, the second gaming headset 504b communicates the demodulated data to a second screen communication device 506b. In step 614, a second gamer listening to the second gaming headset 504b consumes the demodulated data utilizing a second application 507b running on the second screen communication device 506b.

In accordance with en exemplary embodiment of the disclosure, with reference to FIG. 5A, a gaming headset 504a may be operable to receive a plurality of audio channels during play of a particular game. The plurality of audio channels comprises game audio channels that convey audio for the game, and a chat audio channel that conveys chat audio. The gaming headset 504a may comprise an integrated analog voiceband modem 524c (FIG. 5B) that modulates data for communication over the chat audio channel, and transmits the modulated data on the chat audio channel that conveys the chat audio. The modulated data may comprise one or more dual tone multi-frequency tones. The modulated data may be communicated, via the chat audio channel, to one or more devices (e.g. second screen communication devices 506b, . . . , 506n) associated with one or more other gamers that are engaged in the play of the particular game. The gaming headset 504a may be operable to receive data, via the chat audio channel, from one or more devices (e.g. second screen communication devices 506b, . . . , 506n) associated with one or more other gamers that are engaged in the play of the particular game. The gaming headset 504a may be operable to demodulate the data, which is received via the chat audio channel, from the one or more devices (e.g. second screen communication devices 506b, . . . , 506n) associated with one or more other gamers that are engaged in the play of the particular game.

The data that is transmitted and/or demodulated by the gaming headset 504a may comprise parameter settings, scrambling keys, and/or messages comprising text, image, and/or video content. The gaming headset 504a, may be operable to convert at least a portion of the demodulated data to audio data, which may be played from speakers on the gaming headset 504a. The gaming headset 504a may be operable to receive the data from a second screen communication device 506a that is communicatively coupled to the gaming headset 504a. A gamer that is engaged in the particular game may utilize the second screen communication device 506a to send the data to the gaming headset 504a. The gaming headset 504a may be operable to receive the data from the second screen communication device 506a may be communicated to another second screen communication device (e.g. second screen communication devices 506b, . . . , 506n) via the chat audio channel. The another second screen communication device (e.g. second screen communication devices 506b, . . . , 506n) may be utilized by another gamer that is engaged in the particular game. The gaming headset 504a may be operable to acquire the modulated data from a storage device such as the memory 524b (FIG. 5B) within the gaming headset 504a.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Throughout this disclosure, the use of the terms dynamically and/or adaptively with respect to an operation means that, for example, parameters for, configurations for and/or execution of the operation may be configured or reconfigured during run-time (e.g., in, or near, real-time) based on newly received or updated information or data. For example, an operation within a transmitter and/or a receiver may be configured or reconfigured based on, for example, current, recently received and/or updated signals, information and/or data.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method comprising:
   in a gaming headset that receives a chat audio channel that conveys chat audio signals, wherein said gaming headset comprises a voiceband modem:
   modulating non-chat data onto a first voiceband signal for communication over said chat audio channel; and
   transmitting said first voiceband signal modulated by the data on said chat audio channel that conveys said chat audio signals.

2. The method according to claim 1, comprising communicating said first voiceband signal modulated by said data, via said chat audio channel, to one or more devices associated with one or more other gamers that are engaged in said play of said game.

3. The method according to claim 1, wherein said data comprises parameter settings, scrambling keys, and/or messages comprising text, image, and/or video content.

4. The method according to claim 1, comprising receiving said first voiceband signal carrying said data from a second screen communication device that is communicatively coupled to said gaming headset, wherein said second screen communication device is utilized by a gamer that is engaged in said game.

5. The method according to claim 4, comprising communicating said data that is received from said second screen communication device to another second screen communication device via said chat audio channel, wherein said another second screen communication device is utilized by another gamer that is engaged in said game.

6. The method according to claim 1, wherein said voiceband signal modulated by said data comprises one or more dual tone multi-frequency tones.

7. The method according to claim 1, comprising acquiring said data from a storage device within said gaming headset.

8. A system comprising:
   a gaming headset that receives a chat audio channel that conveys chat audio signals, wherein said gaming headset comprises a voiceband modem operable to:
   modulate non-chat data onto a first voiceband signal for communication over said chat audio channel; and
   transmit said first voiceband signal modulated by the data on said chat audio channel that conveys said chat audio signals.

9. The system according to claim 8, wherein said gaming headset is operable to communicate said voiceband signal modulated by said data, via said chat audio channel, to one or more devices associated with one or more other gamers that are engaged in said play of said game.

10. The system according to claim 8, wherein said data comprises parameter settings, scrambling keys, and/or messages comprising text, image, and/or video content.

11. The system according to claim 8, wherein said gaming headset is operable to receive said first voiceband signal carrying said data from a second screen communication device that is communicatively coupled to said gaming headset, wherein said second screen communication device is utilized by a gamer that is engaged in said game.

12. The system according to claim 11, wherein said gaming headset is operable to communicate said data that is received from said second screen communication device to another second screen communication device via said chat audio channel, wherein said another second screen communication device is utilized by another gamer that is engaged in said game.

13. The system according to claim 8, comprising acquiring said data from a storage device within said gaming headset, wherein said first voiceband signal modulated by said data comprises one or more dual tone multi-frequency tones.

14. The system according to claim 8, wherein said data is acquired from a storage device within said gaming headset.

15. A non-transitory computer readable medium having stored thereon, a computer program having at least one code section that is executable by circuitry of a gaming headset for causing the gaming headset to perform steps comprising:
   modulating non-chat data onto a first voiceband signal for communication over a chat audio channel, wherein:
   said gaming headset receives a chat audio channel that conveys chat audio signals; and
   said gaming headset comprises a voiceband modem;
   transmitting, by said voiceband modem, said first voiceband signal modulated by said data on said chat audio channel that conveys said chat audio signals.

* * * * *